(12) United States Patent
Verma et al.

(10) Patent No.: US 11,588,978 B2
(45) Date of Patent: Feb. 21, 2023

(54) UNDER-DISPLAY CAMERA SYSTEMS AND METHODS

(71) Applicant: QUALCOMM Incorporated, San Diego, CA (US)

(72) Inventors: Nikhil Verma, Bangalore (IN); Vishnu Vardhan Kasilya Sudarsan, Bangalore (IN); Naga Chandan Babu Gudivada, Hyderabad (IN); Darshana Parmanand Hotkar, Hyderabad (IN); Balamukund Sripada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/179,822

(22) Filed: Feb. 19, 2021

(65) Prior Publication Data
US 2022/0272246 A1 Aug. 25, 2022

(51) Int. Cl.
*H04N 5/235* (2006.01)
*G06T 7/50* (2017.01)
*G06T 5/50* (2006.01)

(52) U.S. Cl.
CPC ............ *H04N 5/2352* (2013.01); *G06T 5/50* (2013.01); *G06T 7/50* (2017.01); *H04N 5/2351* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 9,870,024 B2* | 1/2018 | Evans, V | G02F 1/1368 |
| 10,320,962 B1* | 6/2019 | Chang | G06F 3/147 |
| 11,095,762 B2* | 8/2021 | Onyekwelu | H04N 5/2257 |
| 2008/0001069 A1 | 1/2008 | Perlman et al. | |
| 2008/0106628 A1 | 5/2008 | Cok et al. | |
| 2009/0102763 A1 | 4/2009 | Border et al. | |
| 2010/0027983 A1* | 2/2010 | Pickens | H04N 5/232127 348/E5.022 |
| 2012/0229674 A1* | 9/2012 | Solomon | H04N 5/772 348/E5.031 |
| 2015/0271392 A1* | 9/2015 | Musgrave | G09G 3/36 348/207.11 |
| 2017/0124932 A1* | 5/2017 | Evans, V | G09G 5/377 |
| 2017/0124933 A1 | 5/2017 | Evans, V et al. | |
| 2020/0389575 A1 | 12/2020 | Gove | |

(Continued)

OTHER PUBLICATIONS

"Display Cutouts", Android Open Source Project, Retrieved on Mar. 3, 2021, 6 pages, https://source.android.com/devices/tech/display/display-cutouts.

(Continued)

*Primary Examiner* — James M Hannett
(74) *Attorney, Agent, or Firm* — Qualcomm Incorporated

(57) ABSTRACT

An example image capture device includes memory and one or more processors coupled to the memory and a camera sensor. The camera sensor is disposed to receive light through at least a portion of a display. The one or more processors are configured to determine an effective aperture for the camera sensor. The one or more processors are configured to apply a mask to one or more pixels in the at least a portion of the display, wherein the mask is based on the effective aperture. The one or more processors are configured to capture an image using the camera sensor.

28 Claims, 10 Drawing Sheets

(56) References Cited

U.S. PATENT DOCUMENTS

2021/0035485 A1* 2/2021 Hoffman .............. G09G 3/2003
2021/0151523 A1* 5/2021 Zhou ...................... G02F 1/163

OTHER PUBLICATIONS

DOFmaster, "Depth of Field Equations", Retrieved on Mar. 5, 2021, 2 pages, www.dofmaster.com/equations.html#:~:text=f-number is calculated by,f%2F2.8%2C.
Greenleaf A.R., "Photographic Optics", The Royal Photographic Society of Great Britain, Optical Society of America, The Macmillan Company, New York, 1950, 9 pages.
Kerr D.A., "Depth of Field in Film and Digital Cameras", 70th Birthday Series, Issue 10, May 15, 2006, pp. 1-27.
"The First In-Display Selfie Camera Solution is now in Mass Production", Jun. 8, 2020, 3 pages, Retrieved on Mar. 3, 2021, https://www.androidauthority.com/in-display-selfie-camera-mass-production-1126753/.
Visionox, "Visionox InV See™ is the World's First Under-Display Camera Solution to Achieve Mass Production", Retrieved on Mar. 3, 2021, 2 pages, www.visionox.com/en/news/show-1341.html.
International Search Report and Written Opinion—PCT/US2022/014961—ISA/EPO—dated Apr. 22, 2022, 12 pp.

\* cited by examiner

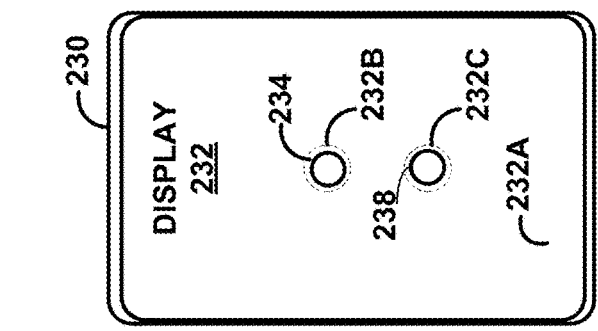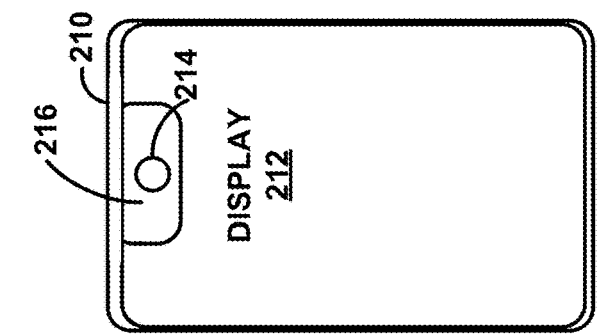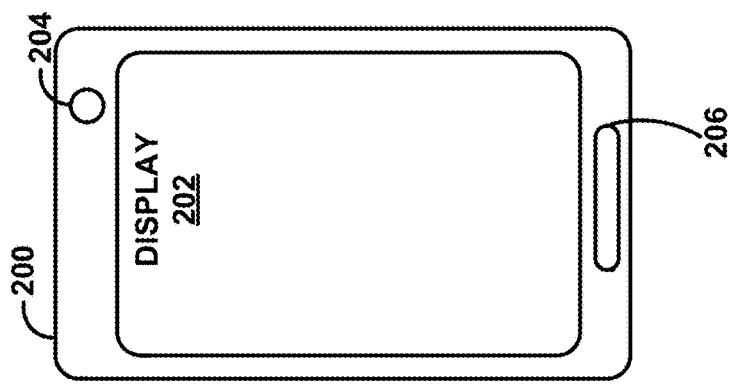

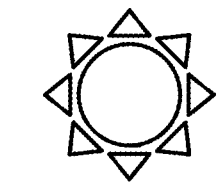
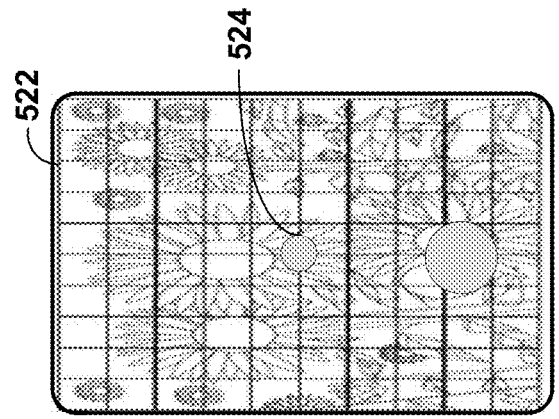
FIG. 9C
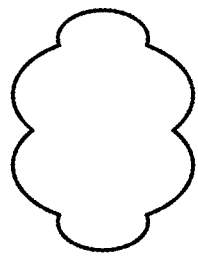
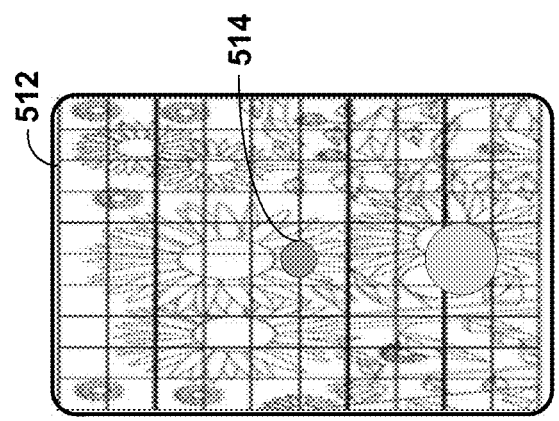
FIG. 9B
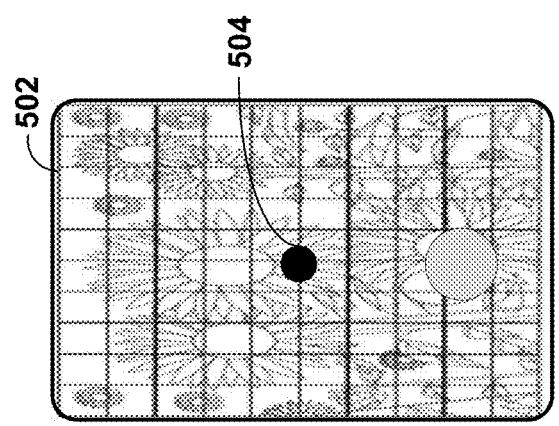
FIG. 9A

UNDER-DISPLAY CAMERA SYSTEMS AND METHODS

TECHNICAL FIELD

This disclosure generally relates to image and camera processing.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile phones (including cellular or satellite radio phones), camera-equipped tablets or personal digital assistants (PDAs), computer devices that include cameras such as so-called "webcams," or any devices with digital imaging or video capabilities.

Image capture devices may be capable of producing imagery under a variety of lighting conditions (e.g., illuminants). For example, image capture devices may operate in environments that include large amounts of reflected or saturated light, as well as in environments that include high levels of contrast. Some example image capture devices include an adjustment module for auto exposure control, auto white balance, and auto focus, in addition to other modules (e.g., a tint adjustment module), to adjust the processing performed by the imaging signal processor hardware.

SUMMARY

In general, this disclosure describes techniques for image capture, including determining and applying an effective aperture for under-display camera sensors, such as those used in front-facing cameras. One way to maximize display size on an image capture device is to place one or more camera sensors underneath the display. When a camera sensor is placed under a display, the layers of the display, which include sub-pixel circuitry, shade the camera sensor, so that less intensive and less accurate image information is received by the camera sensor than if the camera sensor was not under the display. For example, the display may be a liquid crystal display (LCD), a light-emitting diode (LED) display, an organic light-emitting diode (OLED) display, an active matrix organic light-emitting diode (AMOLED), which may be a specific example of an OLED display, or other display. For example, layers of the display may attenuate the ambient light reaching the camera sensor and sub-pixels above the camera sensor may cause shading, such as spatial strides and shadows, which may negatively impact image quality of images captured by the under-display camera sensor.

Sub-pixels include elements that make up a pixel, such as red, blue and green elements of an RGB pixel. Natural light travels through the display onto the camera sensor. The region of the display through which the natural light is passing may have areas with physical pixel elements and areas without physical pixel elements. The transparency rate (or amount of light that passes through the display) may be different for areas with physical pixel elements and areas without physical pixel elements.

Most camera sensors, especially those used in mobile phones, such as smartphones, have a fixed aperture. With the camera sensor disposed under or partially under at least a portion of a display or adjacent to a display reducing the amount of light reaching the camera sensor due to display shading, the fixed aperture of the camera sensor may further negatively impact the image quality of an image captured by the camera sensor when compared to a variable aperture camera sensor. This disclosure describes techniques for determining an effective aperture and applying the effective aperture to a display to compensate for display shading with under-display cameras, such as camera sensors disposed below displays, partially below displays or adjacent to displays, such that light passes through a display layer before being received by the camera sensor. Additionally, or alternatively, in some examples, this disclosure describes techniques for determining an effective aperture and applying the effective aperture to a display to implement an effects mode, such as a bokeh mode, soft-focus mode, portrait mode, or the like.

This disclosure also describes techniques for improving transmittance in a display. These techniques for improving transmittance are complementary or alternative to the image capture techniques of this disclosure and may be used with the image capture techniques disclosed herein or may be used separately. In one example, a mask may be applied to implement the effective aperture in the display. In some examples, the mask may vary a size of an area or region in which pixels are set to black (e.g., alpha value is set to zero) or unaddressed over a camera sensor. In some examples, the mask may vary an alpha value of pixels in an area or region over the camera sensor. An alpha value is a measure of transparency of a displayed color. In other examples, the mask may vary a size of an area or region in which pixels are set to a varying alpha value over a camera sensor. In some examples, configuration settings, such as auto exposure control, auto focus, and/or auto white balance may be used by an image capture device to determine a desired effective aperture.

In one example of this disclosure, an image capture apparatus includes memory; and one or more processors coupled to the memory and a camera sensor, the camera sensor being disposed to receive light through at least a portion of a display, the one or more processors being configured to: determine an effective aperture for the camera sensor; apply a mask to one or more pixels in the at least a portion of the display, wherein the mask is based on the effective aperture; and capture an image using the camera sensor.

In another example, this disclosure describes a method including determining an effective aperture for a camera sensor, the camera sensor being disposed to receive light through at least a portion of a display, applying a mask to one or more pixels in the at least the portion of the display, wherein the mask is based on the effective aperture, and capturing an image using the camera sensor.

In another example, this disclosure describes an image capture apparatus includes means for determining an effective aperture for a camera sensor, the camera sensor being disposed to receive light through at least a portion of a display, means for applying a mask to one or more pixels in the at least the portion of the display, wherein the mask is based on the effective aperture, and means for capturing an image using the camera sensor.

In another example, this disclosure describes a non-transitory computer-readable storage medium storing instructions that, when executed, causes one or more processors to: determine an effective aperture for a camera sensor, the camera sensor being disposed to receive light through at least a portion of a display; apply a mask to one or more pixels in the at least a portion of the display, wherein the mask is based on the effective aperture; and capture an image using the camera sensor.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 2A-2D are block diagrams showing examples of image capture devices having front-facing camera sensors and displays.

FIGS. 9A-9C are conceptual diagrams illustrating further examples of effective apertures in a region of a display over an under-display camera sensor in accordance with the techniques of this disclosure.

DETAILED DESCRIPTION

Figure 1:
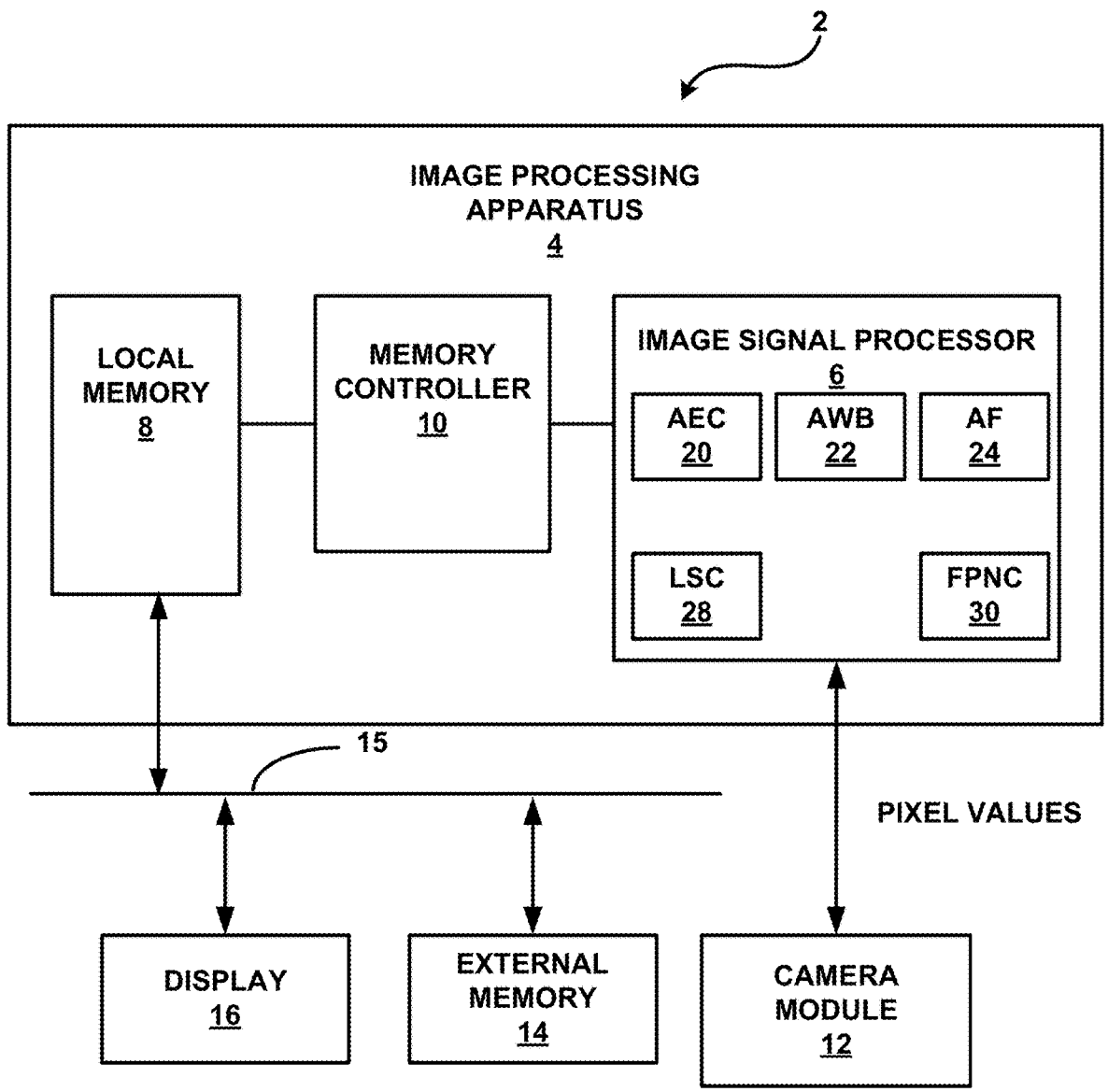
FIG. 1 is block diagram of an exemplary image capture device that is configured to implement techniques of this disclosure.

This disclosure describes effective aperture techniques for use with a camera sensor being disposed below at least a portion of a display (e.g., an under-display camera sensor). The display may use a transparent material with a pixel structure designed so that light can penetrate through the display to the camera sensor. A camera sensor used in such a manner may be larger than other front-facing "selfie" cameras and may have a wider fixed aperture lens. For example, the camera sensor size need not be limited or constrained by bezel or border space surrounding the display. By locating a camera sensor under a display on a device such that the camera sensor may receive light through at least a portion of the display, the size of the usable display space may be enlarged when compared to a similar sized device with space on the front of the device dedicated for a camera sensor. Alternatively, a smaller form factor may be used to provide the same usable display size. Additionally, by locating a camera sensor under a display, the camera sensor may be placed anywhere under the display. For example, the camera sensor may be located where a user's eyes may be directed to when taking a "selfie." In this manner, the gaze of the eyes in the image captured by the camera sensor may appear to be looking at the camera and not under the camera as may occur with camera sensors being located above the display or near the top of the image capture device.

In many image capture devices, it may be desirable to maximize the size of the display on the image capture device. This is particularly the case with smaller image capture devices, such as mobile phones and other mobile devices. Many image capture devices (e.g., mobile devices) include a front-facing camera (a "selfie" camera) that faces towards the user of the mobile device. Maximizing display size on image capture devices with a front-facing camera(s) is not without limitations. Front-facing cameras have been located on the front face of an image capture device between the edge of the device and the edge of the display. To maximize display size on image capture devices having front-facing cameras, some manufacturers have enlarged the display and introduced a notch in the display to avoid covering the camera sensor with the display. Others have enlarged the display to substantially cover the front face of the image capture device and added a pop-up camera rather than place the camera sensor on the body of the image capture device.

One way to maximize display size is to locate a camera sensor under the display. However, by locating the camera sensor under the display, the display may cause attenuation, spatial strides and shadows, light scattering or diffusion, and/or other undesirable effects in the image signal captured by the camera sensor. For example, haze, glare and/or color cast may impact the quality of image being captured. In general, the aforementioned undesirable effects of using an under-display camera may be referred to as display shading. With today's high-resolution screens placing more pixels in a given area than older lower resolution screens, the amount of light captured by an under-display camera sensor may be significantly reduced which may lead to poor quality images being captured.

For a better low light image capture, a larger camera sensor with larger pixel size can be used for better low light image capture. However, in a bright scene, such a camera sensor may yield an over exposed image.

Many image capture devices, including the vast majority of camera sensors included in mobile phones, have a fixed aperture instead of a variable aperture. This may make it more difficult to capture high quality images in a variety of light situations. Additionally, the fixed aperture camera sensor may make it more difficult to change a depth of focus to produce different effects, such as soft focus, portrait, or bokeh images. This disclosure describes techniques for determining and implementing an effective aperture despite camera sensor having a fixed aperture and despite the existence of display shade. An effective aperture may be a variable aperture residing in an area of a display located above an under-display camera that may be created and/or changed using a software mask(s) which may be blended with content to be displayed. This disclosure also describes masking techniques for managing the effective aperture in different light situations and different focal situations, such as bokeh, soft-focus, or portrait. For example, in low light situations, less light may pass through the display to an under-display camera sensor than in high light situations. This disclosure describes techniques to implement an adaptable effective aperture even though the under-display camera sensor may have a fixed aperture so that the camera sensor may receive an appropriate amount of light to capture an aesthetically pleasing image.

FIG. 1 is a block diagram illustrating a device 2 that may be configured to perform the techniques of this disclosure. Device 2 may form part of an image capture device, or a digital video device capable of coding and transmitting and/or receiving still images and/or video sequences. By way of example, device 2 may form part of a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

As shown in FIG. 1, device 2 includes an image processing apparatus 4 to store raw image data and perform various processing techniques on such data. Image processing apparatus 4 may comprise one or more integrated circuits that include a digital signal processor (DSP), on-chip memory, and possibly hardware logic or circuitry. More generally, image processing apparatus 4 may comprise any combination of processors, hardware, software or firmware, and the various components of image processing apparatus 4 may be implemented as such. Also, image processing apparatus 4 may comprise a single integrated chip or an encoder/decoder (CODEC), if desired.

In the illustrated example of FIG. 1, image processing apparatus 4 includes a local memory 8, a memory controller 10 and an image signal processor 6. Image signal processor 6 may be a general-purpose processing unit or may be a processor specially designed for imaging applications, for example, for a handheld electronic device. As shown, image signal processor 6 is coupled to local memory 8 and external memory 14 via memory controller 10. In some examples, local memory 8 may be incorporated in image signal processor 6, for example, as cache memory.

As shown in FIG. 1, image signal processor 6 may be configured to execute an auto exposure control (AEC) process 20, an auto white balance (AWB) process 22, an auto focus (AF) process 24, a lens shade compensation (LSC) process 28 and/or a fixed pattern noise compensation (FPNC) process 30. In some examples, image signal processor 6 may include hardware-specific circuits (e.g., an application-specific integrated circuit (ASIC)) configured to perform the AEC process 20, AWB process 22, AF process 24, LSC process 28 and/or FPNC process 30. In other examples, image signal processor 6 may be configured to execute software and/or firmware to perform the AEC process 20, AWB process 22, AF process 24, LSC process 28 and/or FPNC process 30. When configured in software, code for AEC process 20, AWB process 22, AF process 24, LSC process 28 and/or FPNC process 30 may be stored in local memory 8 and/or external memory 14. In other examples, image signal processor 6 may perform the AEC process 20, AWB process 22, AF process 24, LSC process 28 and/or FPNC process 30 using a combination of hardware, firmware, and/or software. When configured as software, AEC process 20, AWB process 22, AF process 24, LSC process 28 and/or FPNC process 30 may include instructions that configure image signal processor 6 to perform various image processing and device management tasks, including effective aperture techniques of this disclosure.

AEC process 20 may include instructions for configuring, calculating, storing, and/or applying an exposure setting of a camera module 12. An exposure setting may include the shutter speed and aperture settings, such as an effective aperture setting according to the techniques of this disclosure, to be used to capture images. In accordance with techniques of this disclosure, image signal processor 6 may use depth information captured by camera module 12 to better identify the subject of an image and make exposure settings based on the identified subject. AF process 24 may include instructions for configuring, calculating, storing, and/or applying an auto focus setting of camera module 12.

AWB process 22 may include instructions for configuring, calculating, storing and/or applying an AWB setting (e.g., an AWB gain) that may be applied to one or more images captured by camera module 12. In some examples, the AWB gain determined by AWB process 22 may be applied to the image from which the AWB gain was determined. In other examples, the AWB gain determined by AWB process 22 may be applied to one or more images that are captured after the image from which the AWB gain was determined. Hence, AWB gain may be applied to a second image captured subsequently to the first image from which the AWB gain is determined. In one example, the second image may be the image captured immediately after the first image from which the AWB gain was determined. That is, if the first image is frame N, the second image to which the AWB gain is applied is frame N+1. In other examples, the second image may be the image captured two images after the first image from which the AWB gain was determined. That is, if the first image is frame N, the second image to which the AWB gain is applied is frame N+2. In other examples, the AWB gain may be applied to images captured further in time from the first image (e.g., frame N+3, frame N+4, etc.). In other examples, the AWB gain may be applied to first image from which the AWB gain is determined.

LSC process 28 may include instructions for configuring, calculating, storing and/or applying a lens shade compensation gain. For example, LSC process 28 may compensate for light falling-off towards the edges of an image due to a camera lens.

FPNC process 30 may include instructions for configuring, calculating, storing and/or applying an FPN compensation process. For example, FPNC process 30 may subtract a master dark frame from the captured image to compensate for FPN.

Local memory 8 may store raw image data and may also store processed image data following any processing that is performed by image signal processor 6. Local memory 8 may be formed by any of a variety of non-transitory memory devices, such as dynamic random-access memory (DRAM), including synchronous DRAM (SDRAM), magnetoresistive RAM (MRAM), resistive RAM (RRAM), or other types of memory devices. Memory controller 10 may control the memory organization within local memory 8. Memory controller 10 also may control memory loads from local memory 8 to image signal processor 6 and write backs from image signal processor 6 to local memory 8. The images to be processed by image signal processor 6 may be loaded directly into image signal processor 6 from camera module 12 following image capture or may be stored in local memory 8 during the image processing.

As noted, device 2 may include a camera module 12 to capture the images that are to be processed, although this disclosure is not necessarily limited in this respect. Camera module 12 may comprise arrays of solid-state sensor elements such as complementary metal-oxide semiconductor (CMOS) sensor elements, charge coupled device (CCD) sensor elements, or the like. Alternatively, or additionally, camera module 12 may comprise a set of image or camera sensors that include color filter arrays (CFAs) arranged on a surface of the respective sensors. Camera module 12 may be coupled directly to image signal processor 6 to avoid latency in the image processing. Camera module 12 may be configured to capture still images, or full motion video sequences, in which case the image processing may be performed on one or more image frames of the video sequence.

Camera module 12 may send pixel values (e.g., in a Bayer or RGB format), and/or raw statistics messages describing the captured image to image signal processor 6. In general, image signal processor 6 may be configured to analyze the raw statistics and depth information to calculate and/or determine imaging parameters, such as sensor gain, R/G/B gain, AWB gain, shutter speed, effective aperture size, and the like. The calculated and/or determined imaging parameters may be applied to the captured image, applied to one or more subsequently captured images, and/or sent back to camera module 12 to adjust an effective aperture, exposure, and/or focus settings.

Device 2 may include a display 16 that displays an image following the image processing described in this disclosure. After such image processing, the image may be written to local memory 8 or external memory 14. The processed images may then be sent to display 16 for presentation to the user. Display 16 may display other information, including visual representations of files stored in a memory location (e.g., external memory 14), software applications installed in image signal processor 6, user interfaces, network-accessible content objects, and other information.

In some examples, device 2 may include multiple memories. For example, device 2 may include external memory 14, which typically comprises a relatively large memory space. External memory 14, for example, may comprise DRAM or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise SDRAM. In any case, external memory 14 and local memory 8 are merely exemplary, and may be combined into the same memory part, or may be implemented in any number of other configurations.

Device 2 may also include a transmitter (not shown) to transmit the processed images or coded sequences of images to another device. Indeed, the techniques of this disclosure may be used in handheld wireless communication devices (such as smartphones) that include digital camera functionality or digital video capabilities. In that case, the device would also include a modulator-demodulator (MODEM) to facilitate wireless modulation of baseband signals onto a carrier waveform in order to facilitate wireless communication of the modulated information.

Local memory 8, display 16 and external memory 14 (and other components if desired) may be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

FIGS. 2A-2D are block diagrams showing examples of image capture devices (such as smartphones). Each image capture device is depicted with a display and a front-facing camera sensor. In this context, a front-facing camera sensor is a camera sensor that faces the user of image capture device in typical operation. For example, a front-facing camera sensor is typically on the same side of the device as the main display. Each front-facing camera sensor may be a part of a camera module, such as camera module 12. For example, in FIG. 2A, image capture device 200 includes display 202, camera sensor 204 and button 206. Button 206 may serve multiple purposes, such as to wake up image capture device 200, change what is being displayed on display 202, etc. As can be seen, button 206 and camera sensor 204 take up space on the front of image capture device 200. By locating camera sensor 204 and button 206 on the front of image capture device 200, less area is available for display 202.

In the example of FIG. 2B, image capture device 210, on the other hand does not have a button on the front. In this case the button may be on the side or the functions of the button may be included in display 212 (e.g., through a touch display interface). Image capture device 210 is depicted with camera sensor 214 and notch 216. Notch 216 may be an area removed from the display before assembly of image capture device 210. In this example, the area covered by notch 216 is therefore not part of display 212 and does not display content. Notch 216 may be employed in order to increase the ratio of front side of image capture device 210 occupied by display 212 when compared to image capture device 200 of FIG. 2A.

In the example of FIG. 2C, image capture device 220 has a display 222 and a pop-up camera 226. Camera sensor 224 may be contained in pop-up camera 226. In the example of image capture device 220, the entirety of display 222 may display content and there is no notch, such as in image capture device 210 of FIG. 2B.

In the example of FIG. 2D, image capture device 230 has a display 232 and a camera sensor 234. In some examples, image capture device 230 may have more than one camera sensor. For example, image capture device 230 may have camera sensor 234 and camera sensor 238. In some examples, camera sensor 234 and camera sensor 238 may be fixed aperture camera sensors. Image capture device 230 may comprise or be an example of device 2 and display 232 may be an example of display 16. In the example of image capture device 230 of FIG. 2D, unlike the examples of FIGS. 2A-2C, camera sensor 234 and camera sensor 238 are disposed below display 232. In some examples, a portion of, rather than all of, camera sensor 234 or camera sensor 238 may be disposed below display 232. Display 232 may comprise transparent layers. Region 232A of display 232, 232B of display 232, and region 232C of display 232 will be discussed further with respect to FIGS. 5, 7, and 9. While the techniques of this disclosure are generally described with reference to an image capture device with a camera sensor disposed below a display, such as image capture device 230, the techniques of this disclosure may be used with other image capture devices, such as image capture devices 200, 210 and 220 or an image capture device with a camera sensor partially disposed under a display.

Referring now to each of FIGS. 2A-2D, image capture device 200 has a larger form factor than image capture devices 210, 220 and 230, but has the same size display 202 as display 222 of image capture device 220 and display 232 of image capture device 230 and a slightly larger display 202 than display 212 of image capture device 210 due to notch 216. Image capture device 210 has the same size form factor as image capture devices 220 and 230, but it has less usable display space on display 212 due to notch 216. Additionally, notch 216 may be distracting to some users. Image capture device 220 has the same form factor and usable display size as image capture device 230, however image capture device 220 has moveable parts in pop-up camera 226. These moveable parts may become broken or jammed with repeated use or with a user dropping image capture device 220 onto a hard surface. Therefore, it may be desirable to locate the camera sensor beneath the display as locating the camera sensor under the display may maximize display space while avoiding notching and moving mechanical parts.

Additionally, with image capture device 230 of FIG. 2D, camera sensor 234 may be located anywhere underneath display 232. In this example, camera sensor is shown located in the middle of display 232. Such a location may be desirable over the locations of the front-facing camera sensors in image capture device 200, image capture device 210 and image capture device 220. For example, a user trying to take a "selfie" may look at a live image of themselves on the display of the image capture device. The further the camera sensor is away from where the user's eyes are pointed, the more likely the image that will be captured will depict the eyes gazing away from the camera sensor. This eye gaze phenomenon may result in aesthetically unappealing images with the user's gaze appearing below (or above) where one may expect them to be looking (e.g., not towards the eyes of the viewer of the image, but downwards (or upwards) from the eyes of the viewer of the image, such as under or over the head of the viewer of the image).

Figure 3:
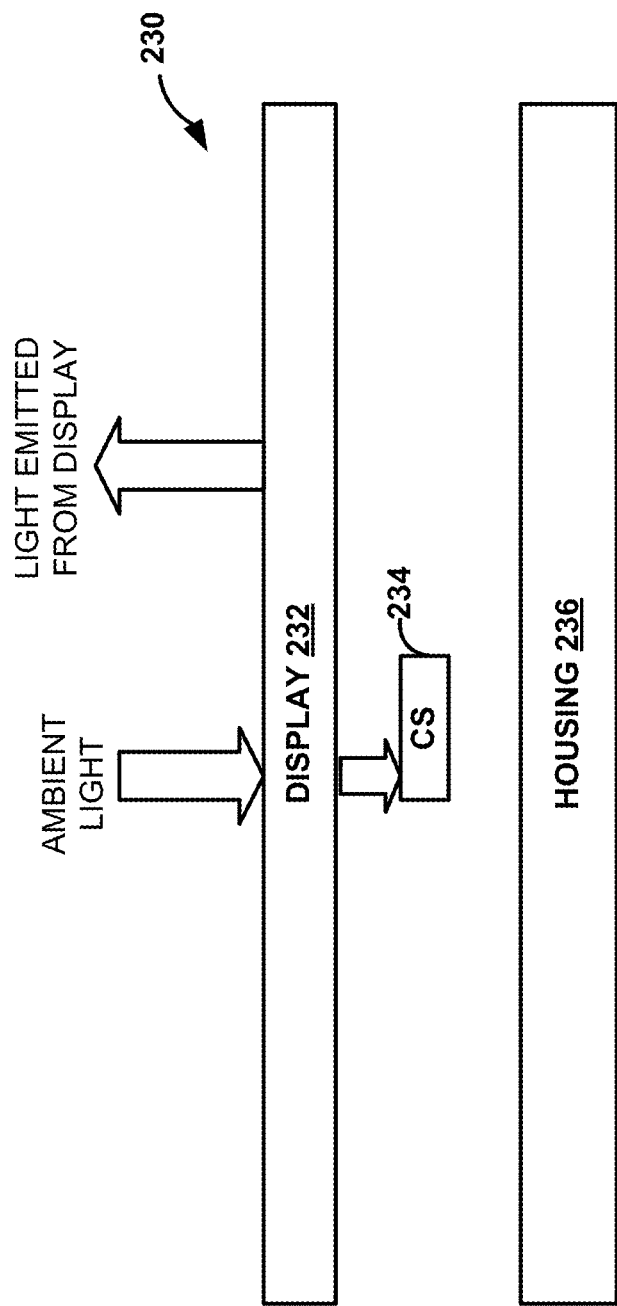
FIG. 3 is a block diagram showing an exploded view of an example image capture device that is configured to implement techniques of this disclosure.

FIG. 3 is a block diagram of an exploded side view of an example of image capture device 230 as shown in FIG. 2D. For simplicity purposes, camera sensor 238 is not shown in FIG. 3 or the remaining figures and may function similarly to camera sensor 234 as described herein. In the example of FIG. 3, image capture device 230 includes display 232, camera sensor (CS) 234 and housing 236. Housing 236 may include electronic circuit boards, processors, memory, battery, radio frequency circuitry, antennas and other components. As shown, display 232 is disposed above camera sensor 234 and camera sensor 234 is disposed below or beneath display 232. In this example, as in FIG. 2D, camera sensor 234 is a front facing camera. Camera sensor 234 is configured to capture images by capturing ambient light passing through display 232. That is to say, camera sensor 234 may receive ambient light that passes through at least a portion of display 232 before being incident on camera sensor 234. As used herein, the camera sensor being under, below or beneath the display or the display being over the camera sensor is intended to describe the camera sensor being configured and located so as to capture images by capturing ambient light passing through the display, such as display 232, or through at least a portion of the display. Display 232 may emit light towards a user and generally away from camera sensor 234 when displaying content. Camera sensor 234 may be actively capturing image(s) while or when display 232 is actively displaying content. In other words, camera sensor 234 may receive ambient light passing through at least a portion of display 232 while display 232 may emit light towards a user.

Figure 4B:
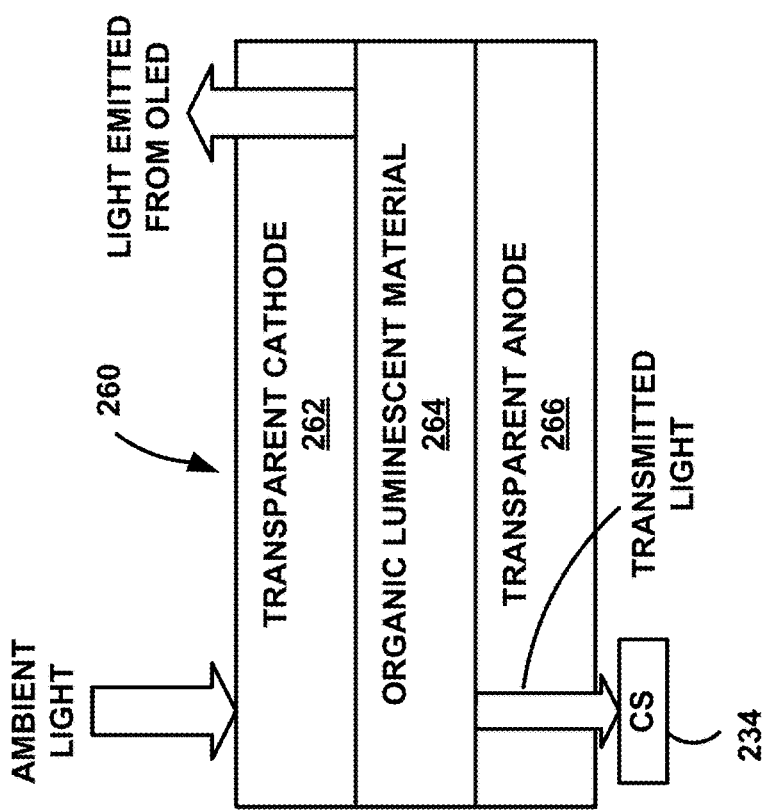
FIGS. 4A-4B are block diagrams illustrating properties of different example OLED displays according to techniques of this disclosure.
Figure 4A:
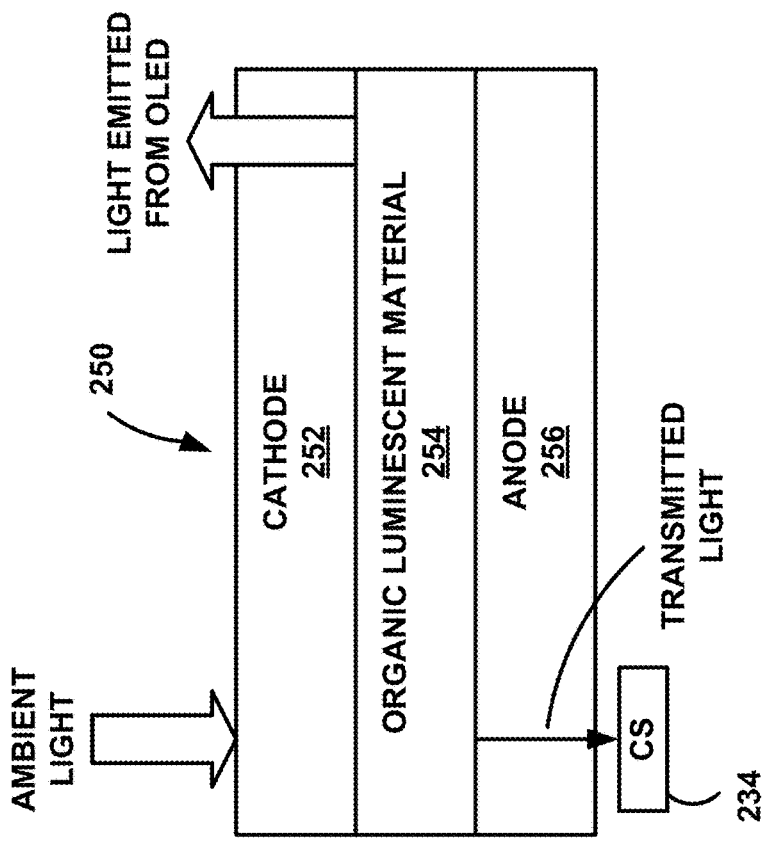

FIGS. 4A and 4B are simplified diagrams of example OLED displays that may be used in accordance with the techniques of this disclosure. While the displays of FIGS. 4A and 4B are depicted as OLED displays, the techniques of this disclosure may be used with any displays that are configured to allow light to pass through the display to a camera sensor located underneath the display, such as LCD, LED, AMOLED, or other displays. In FIGS. 4A and 4B, while the example OLED displays are depicted with three layers, OLED displays may consist of more layers.

In the example of FIG. 4A, OLED display 250 includes cathode layer 252, organic luminescent material layer 254, and anode layer 256. For example, OLED display 250 may emit light when current is run between cathode layer 252 and anode layer 256 through organic luminescent material layer 254 causing an image(s) to appear on OLED display 250. In this manner, organic luminescent material layer 254 may emit light through cathode layer 252 towards a user. In some examples, camera sensor 234 may receive ambient light at the same time that organic luminescent material layer 254 may emit light. In the example of FIG. 4A, the ambient light may strike the face of cathode layer 252. A portion of this ambient light may pass through cathode layer 252, organic luminescent material layer 254 and anode layer 256. In this example, cathode layer 252 and anode layer 256 may not be transparent. Additionally, organic luminescent material layer 254 may have RGB, RGBW, WRGB (where W is white), RGBG or other sub-pixels that may obstruct, attenuate or distort ambient light from passing through organic luminescent material layer 254. Therefore, the amount of ambient light that passes through OLED display 250 may be relatively small (shown as transmitted light). As such, camera sensor 234 receiving the transmitted light beneath OLED display 250 may not receive very much of transmitted light as represented by the thin arrow. This may lead to poor image quality of images captured by the camera sensor.

In the example of FIG. 4B, OLED display 260 includes transparent cathode layer 262, organic luminescent material layer 264 and transparent anode layer 266. As in the example of FIG. 4A, OLED display 260 may emit light when current is run between transparent cathode layer 262 and transparent anode layer 266 through organic luminescent material layer 264 causing an image(s) to appear on OLED display 260. In this manner, organic luminescent material layer 264 may emit light through transparent cathode layer 262 towards a user. In example of FIG. 4B, much more of the ambient light may be transmitted through OLED display 260 to camera sensor 234 because both transparent cathode layer 262 and transparent anode layer 266 are transparent. Camera sensor 234 may receive the ambient light that passes through at least a portion of OLED display 260 before being incident on camera sensor 234 (shown as transmitted light as represented by the thick arrow). In some examples, camera sensor 234 may receive the ambient light at the same time that organic luminescent material layer 264 may emit light. In the example of FIG. 4B, like in the example of FIG. 4A, organic luminescent material layer 264 may contain RGB, RGBW or WRGB sub-pixels that may obstruct, attenuate or distort the ambient light passing through organic luminescent material layer 264. Overall, the attenuation or distortion in the example of FIG. 4B may be less than that of FIG. 4A, for example, due to transparent cathode layer 262 and transparent anode layer 266 being transparent.

Figure 5C:
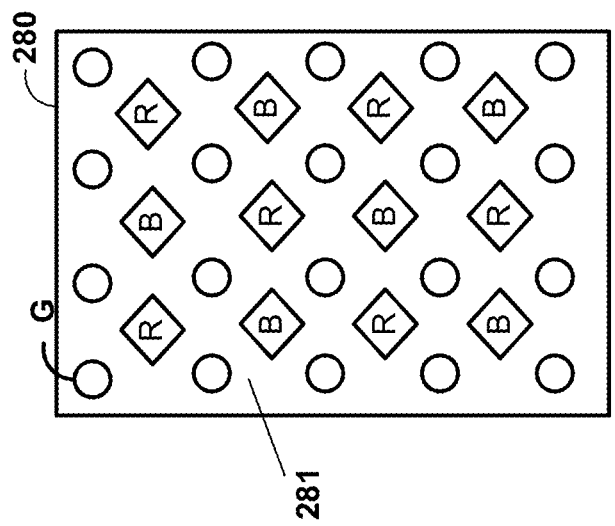
FIGS. 5A-5C are conceptual diagrams showing possible physical layouts of RGB sub-pixels in a display.
Figure 5B:
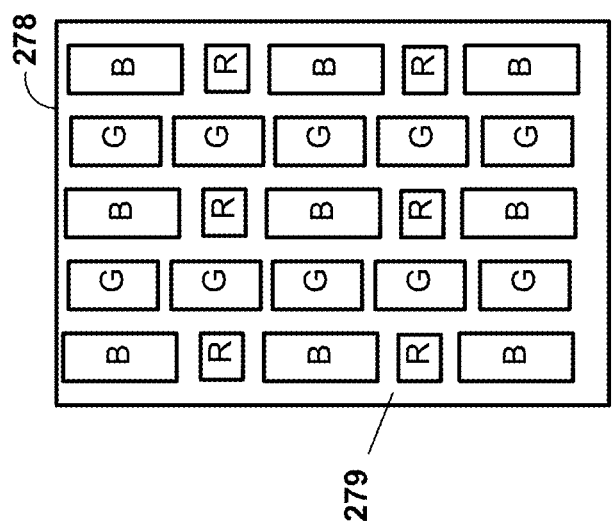
Figure 5A:
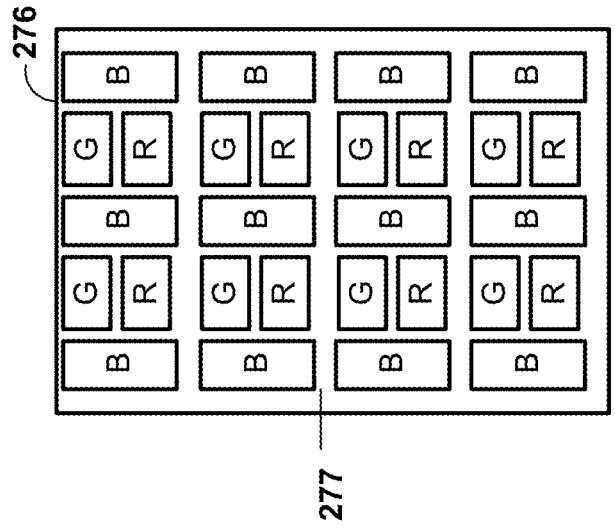

FIGS. 5A-5C are conceptual diagrams depicting example layouts of sub-pixels in a display according to techniques of the present disclosure. As mentioned above, a sub-pixel is an element of a pixel, such as a red, blue or green element of an RGB pixel. While the examples of FIGS. 5A-5C illustrate RGB sub-pixels, a display may contain an RGBW, a WRGB, or another sub-pixel layout. In the example of FIG. 5A, layout 276 includes three columns of blue (B) sub-pixels as shown. Between each column of blue sub-pixels is a column of alternating green (G) and red (R) sub-pixels. In between the sub-pixels there is space 277. In the example of FIG. 5B, layout 278 includes two columns of green (G) sub-pixels as shown. On either side of the green sub-pixel columns is a column of alternating blue (B) and red (R) sub-pixels. In between the sub-pixels there is space 279. In the example of FIG. 5C, layout 280 includes a number of rows of circular shaped sub-pixels. Each of these sub-pixels may be a green (G) sub-pixel. Between the rows of green sub-pixels are diamond shaped alternating red (R) sub-pixels and blue (B) sub-pixels. Between the sub-pixels is space 281. FIGS. 5A-5C are just a few examples of potential layouts of sub-pixels in a display. The shape, size, and location of the sub-pixels is a matter of design choice by a manufacturer of a display. Therefore, the layout of sub-pixels may vary from one manufacturer or one type of display to the next. Information relating to the layout (e.g., shape, size and location) of the sub-pixels may be available from the manufacturer of the display.

When a camera sensor, such as camera sensor 234, is located beneath a display, such as display 232, camera sensor 234 may receive ambient light through the space (e.g., space 277, space 279, or space 281) between sub-pixels. For example, one or more camera sensors may be disposed below or underneath at least a portion of a display layer such that light passes through the display layer prior to being received by the one or more sensors. Although the light may pass through the display layer prior to being received by the one or more camera sensors, such as camera sensor 234, the sub-pixels may shade portions of camera sensor 234 and may cause problems like haze, glare and/or color cast in a captured image(s).

Figure 6:
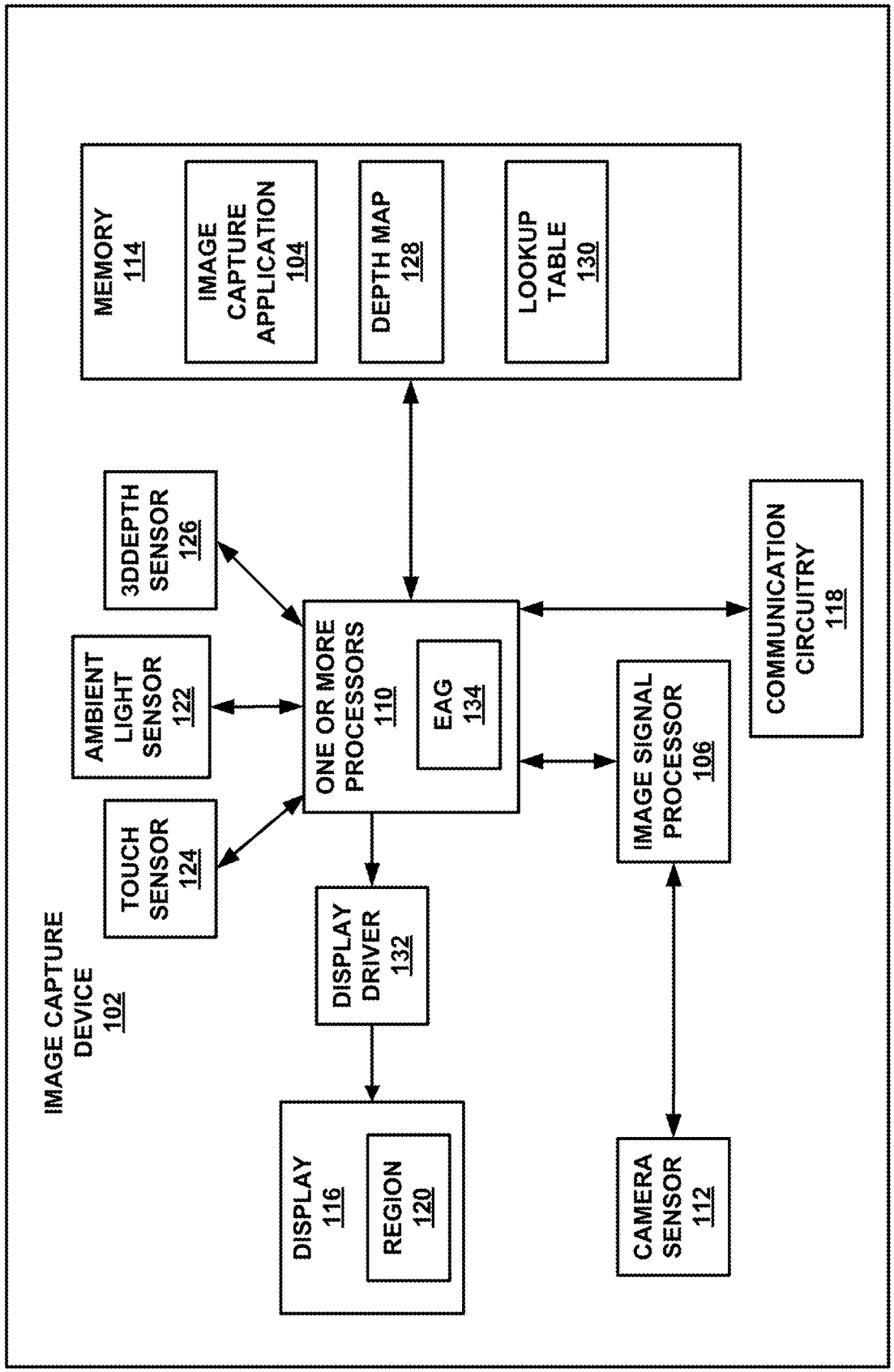
FIG. 6 is a block diagram of an example image capture device that may implement the techniques of this disclosure.

FIG. 6 is a block diagram of an example image capture device that may implement the techniques of this disclosure. Image capture device 102 may be an example of device 2 of FIG. 1. By way of example, image capture device 102 may comprise a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

Image capture device 102 may include one or more processors 110, camera sensor 112, image signal processor 106, memory 114, display 116, communication circuitry 118, ambient light sensor 122, touch sensor 124, 3 dimensional (3D) depth sensor 126, and display driver 132. Camera sensor 112 may be a fixed aperture camera sensor. Display 116 may include a region 120 (which may be an example of region 232B or region 232C of FIG. 2D) located over camera sensor 112 such that camera sensor 112 receives light through region 120. In some examples, image signal processor 106 may be one of one or more processors 110. In some examples, image signal processor 106 may be more than one of one or more processors 110. In some examples, image signal processor 106 may be separate from one or more processors 110, as depicted. In some examples, one or more processors 110 may include effective aperture generator 134 (EAG).

Memory 114 may include an image capture application 104, depth map 128, and lookup table 130. Image capture application 104 may be an application utilized by a user to turn on the camera functionality of image capture device 102. In some examples, image capture application 104 may include instructions that may be executed by one or more processors 110 and/or image signal processor 106 to enable a user to select an effect such as bokeh, soft focus, portrait or enable a user to select an effective aperture. In some examples, image capture application may include instructions that may be executed by one or more processors 110 and/or image signal processor 106 to automatically select an effective aperture and apply a mask to implement the effective aperture through, for example, a display processor which may be one or more of one or more processors 110.

Memory 114 may also be configured to store pixel values relating to an image captured by camera sensor 112. Memory 114 may store instructions, either as part of image capture application 104, separate from image capture application 104, or a combination of image capture application 104 and separate from image capture application 104 for causing one or more processors 110 and/or image signal processor 106 to perform the techniques of this disclosure.

In some examples, one or more processors 110 may use depth map 128 to determine a desired depth of focus or depth of field. For example, one or more processors 110 may track a primary subject and determine a depth of focus or depth of field based on the location of the primary subject from depth map 128. Alternatively, or in addition, one or more processors 110 may use 3D depth sensor 126 to determine a desired depth of focus or depth of field.

In some examples, one or more processors 110 may use lookup table 130 to obtain one or more parameters of the effective aperture. For example, lookup table 130 may store different ambient light levels and respective parameter(s) for effective apertures, such as aperture size and/or alpha values. For example, lookup table 130 may store differences between a frame luma (e.g., light intensity in a frame captured by the camera sensor) and a target luma (e.g., light intensity as determined by an AEC process or module of image signal processor 106) and respective parameter(s) for effective apertures. In some examples, lookup table 130 may be an exposure/diameter table storing diameters of an effective aperture and associated exposure information.

Camera sensor 112 may capture pixel values of an image when activated. For example, when one or more processors 110 are executing image capture application 104, camera sensor 112 may capture pixel values. Image signal processor 106 may process the pixel values captured by camera sensor 112.

One or more processors 110 may obtain the pixel values from image signal processor 106 and may provide the pixel values to memory 114 for storage, to communication circuitry 118 for transmittal to another device, or provide the pixel values to display 116 for display to a user. When the camera is off (e.g., when one or more processors 110 are not executing image capture application 104), one or more processors 110 may obtain the pixel values from memory 114, for example, and provide the pixel values to display 116 for display.

In some examples, according to the techniques of this disclosure, image capture device 102 includes memory 114, one or more processors 110 coupled to memory 114, and camera sensor 112. Camera sensor 112 may be disposed to receive light through at least a portion of display 116 (e.g., region 120). One or more processors 110 may be configured to determine an effective aperture for camera sensor 112, determine a mask based on the effective aperture, apply the mask to one or more pixels in the at least a portion of display 116 (e.g., region 120), and capture an image using camera sensor 112. For example, the mask may be a software layer that may be blended with content to be displayed by display driver 132 to implement an effective aperture in region 120 over camera sensor 112.

Environmental illuminance (e.g., ambient light) may be important to an under-display camera sensor, such as camera sensor 112, as environmental illuminance may affect auto exposure control, auto focus, and auto white balance in image capture device 102. For example, in a dark, low lux environment, an image captured by a smaller fixed aperture camera sensor may be relatively poor, while an image captured in a bright, high lux environment with appropriate image processing may be aesthetically acceptable. However, in a dark, low lux environment, an image captured by a larger fixed aperture camera sensor may be aesthetically acceptable with appropriate image processing, while an image captured in a bright, high lux environment may be washed out. Thus, it may be desirable to determine and implement an adaptable effective aperture which may be used to improve the quality and to apply effects, such as bokeh, soft focus, portrait, to an image captured by an under-display camera sensor.

According to the techniques of this disclosure, image capture device 102 may display an adaptable number of black pixels in region 120 above camera sensor 112. As used herein "black pixels" include pixels having a grayscale value of 0, alpha value of 0, blank pixels, or unaddressed pixels. By displaying an adaptable number of black pixels in region 120 above camera sensor 112, the transmittance of display 116 in region 120 may be controlled and thereby benefit auto exposure control, auto focus, and auto white balance (which may be part of image signal processor 106) of image capture device 102. This adaptable number of black pixels may in effect form "digital shutter blades" of an aperture to adjust the effective aperture through changing a size of a region of black pixels in region 120 above camera sensor 112, thereby changing an amount of light reaching camera sensor 112.

According to the techniques of this disclosure, image capture device 102 may apply an adaptable alpha value to pixels in region 120 above camera sensor 112. By displaying pixels of an adaptable alpha value in region 120 above camera sensor 112, the transmittance of display 116 in region 120 may be controlled and thereby benefit auto exposure control, auto focus, and auto white balance (which may be part of image signal processor 106) of image capture device 102. These adaptable alpha values of the pixels in region 120 above camera sensor 112 may in effect form "digital blades" of an aperture to adjust the effective aperture through changing a transmittance of region 120 above camera sensor 112, thereby changing an amount of light reaching camera sensor 112.

In some examples, according to the techniques of this disclosure, image capture device 102 may apply adaptable alpha values to an adaptable number of pixels in region 120 above camera sensor 112. By displaying an adaptable number of pixels at an adaptable alpha value in region 120 above camera sensor 112, the transmittance of display 116 in region 120 may be controlled.

For example, when the camera is on (e.g., when one or more processors 110 are executing image capture application 104), one or more processors 110 may determine an ambient light level. For example, one or more processors may query ambient light sensor 122 to determine the ambient light level. Ambient light sensor 122 may be configured to sense an ambient light level. One or more processors 110 may look up the ambient light level in lookup table 130 or apply a formula to the ambient light level to determine an effective aperture. In some examples, one or more processors 110 may determine a frame luma, determine a target luma and determine a difference between the frame luma and target luma. In such examples, one or more processors 110 may look up the difference between the frame luma and target luma in lookup table 130 or apply a formula to the difference between the frame luma and target luma to determine an effective aperture.

In some examples, a user may select an effects mode, such as bokeh mode, soft-focus mode, or portrait mode, which may affect the effective aperture. For example, when image capture application 104 is launched, an icon may be displayed which may toggle through different effects modes available for a user to select, for example, via touch sensor 124. When the user taps the icon, touch sensor 124 may send a signal to one or more processors 110 and based at least in part on that signal, one or more processors 110 may determine the effects mode. For example, when a user selects bokeh mode, one or more processors 110 (and/or image signal processor 106) may enlarge the effective aperture beyond what the effective aperture may otherwise be. This larger effective aperture may cause the camera sensor to capture an image with a more blurry presentation of items in the background and sharp items in the foreground.

In some examples, one or more processors may perform a scene analysis on the image being captured by camera sensor 112 and may select an effective aperture based on the scene analysis. For example, if the face of a subject of the image is well lit, but the background is dark, one or more processors may select a different effective aperture than if the entire scene is dark or the entire scene is well lit.

In some examples, the one or more processors 110 may determine the effective aperture based at least in part on whether a flash is in auto mode, set to on, or set to off. For example, if the flash is off one or more processors 110 may determine the effective aperture should be larger than if the flash is on or set to auto. In some examples, one or more processors may determine the effective aperture further based on other sensor signals, such as a camera sensor signal, a depth sensor signal, etc.

In some examples, image capture device 102 may optionally transition or fade in and/or fade out the effective aperture in region 120 to provide a more aesthetically pleasing visual effect. For example, when image capture application 104 is activated, image capture device 102 may fade in the pixels in region 120 above camera sensor 112 that are implementing the effective aperture. In other words, image capture device 102 may transition the pixel alpha values and/or the number of the pixels in region 120 above camera sensor 112 from existing values to the values implementing the effective aperture over a period of time.

Figure 7:
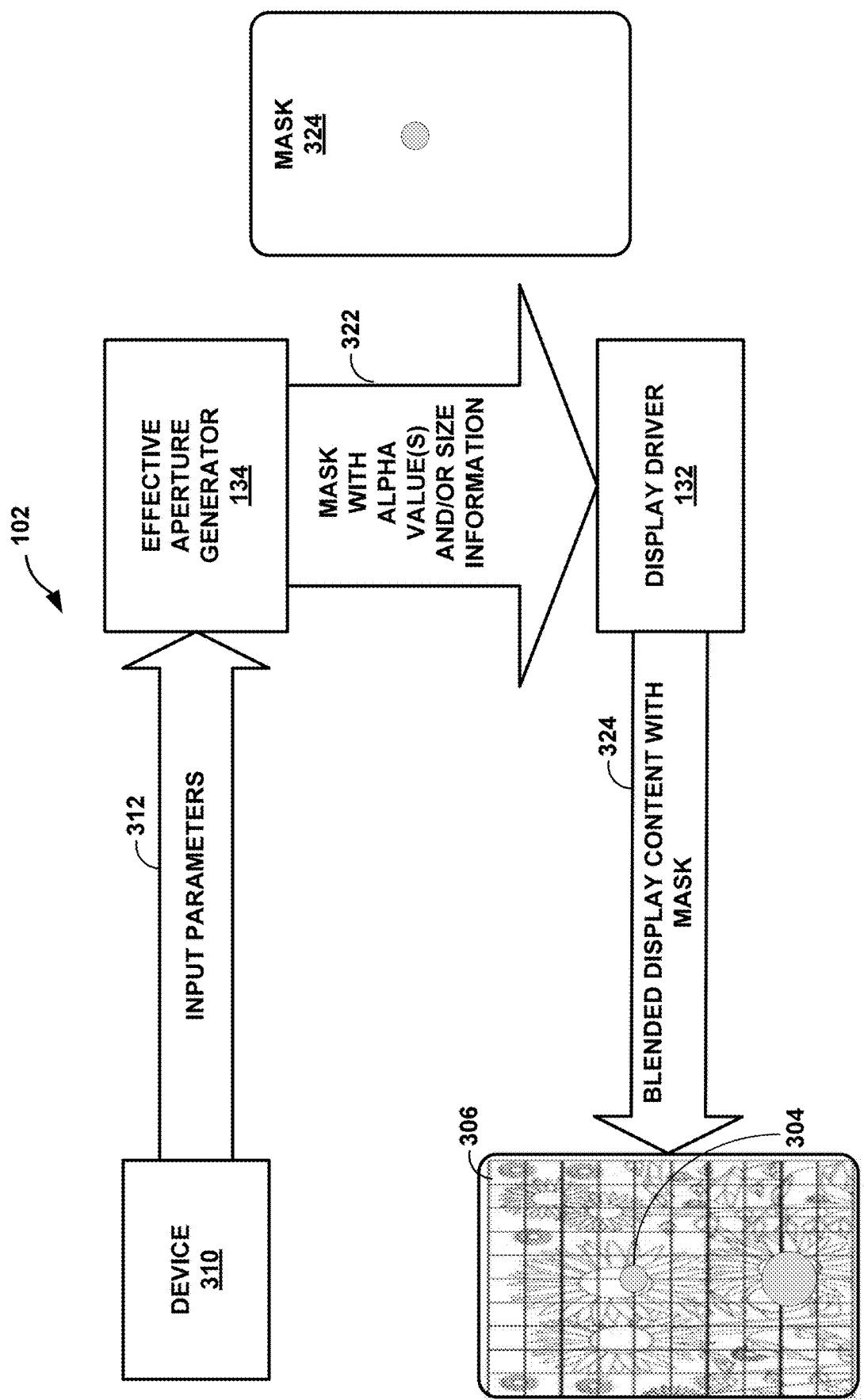
FIG. 7 is a functional block diagram of an example image capture device according to the techniques of this disclosure.

FIG. 7 is a functional block diagram of an example image capture device according to the techniques of this disclosure. According to the techniques of this disclosure, an image capture device 102 having a fixed aperture camera sensor 304 disposed under a display 306 may determine and apply an effective aperture to achieve a target luma and/or a target focal length for a given scene.

For example, device 310, which may be part of image capture device 102 and which may include a camera module (e.g., camera module 12 of FIG. 1), an image signal processor (e.g., image signal processor 6 of FIG. 1), an ambient light sensor (e.g., ambient light sensor 122 of FIG. 6) and/or other various sensors, may determine parameters to be used to determine an effective aperture. For example, device 310 may determine an ambient light level, a frame luma, a target luma, whether a flash is on, off, or set to auto, whether a user has selected an effects mode, etc. Device 310 may send these input parameters 312 for mask generation to an effective aperture generator 134. In some examples, effective aperture generator 134 may be one or more of one or more processors 110 of FIG. 6. Effective aperture generator 134 may determine an effective aperture size and/or alpha level(s) for the effective aperture based on the input parameters. For example, effective aperture generator 134 may determine an aperture diameter, radius, number of pixels, or other measure of area or size, or location thereof, of pixels to be used in a mask to implement the effective aperture. In addition, or alternatively, effective aperture generator 134 may determine an alpha value(s) for pixels to be used in the mask to implement the effective aperture.

For example, effective aperture generator 134 may determine an effective aperture in a diameter of a unit of distance, such as millimeters. For example, effective aperture generator 134 may divide the focal length of the lens (e.g., in mm) by the f-number (also referred to as f-stop). For example, effective aperture generator 134 may use the following formula to determine the effective aperture:

$$D=F/N$$

where D is the diameter of the effective aperture, F is the focal length and N is the f-number.

In some examples, based on frame luma (e.g., light intensity in a frame), the diameter of the effective aperture, D, can be tuned by developing an exposure/diameter table (which may be an example of lookup table 130 of FIG. 6) for different frame luma. In some examples, this exposure/diameter table may be generated in a laboratory through experimentation. In some examples, this exposure/diameter table may be generated by effective aperture generator 134 during operation. In some examples, the exposure/diameter table may be generated during operation based on user input, such as user deletion, non-deletion, or manipulation of images.

For example, for any particular scene being captured by camera sensor 304, AEC process 20, AWB process 22, and/or AF24 process (of FIG. 1) may determine a frame luma which may be included in input parameters 312. Additionally, AEC process 20 may determine a target luma which also may be included in input parameters 312. Effective aperture generator 134 may use an exposure/diameter table or formula to determine the effective aperture D. For example, effective aperture generator 134 may look up the difference between the frame luma and the target luma in lookup table 130 (of FIG. 6) to determine one or more properties of the effective aperture to be used in a mask. In other examples, effective aperture generator 134 may apply a formula(s) to determine one or more properties of the effective aperture to be used in the mask. In some examples, a separate exposure/diameter table may exist for each camera sensor and be tuned separately for each camera sensor.

The mask layer may be a software defined layer to be added to a display, for example, by image capture device 102. The mask may be applied to a region over the camera sensor so as to adjust an effective aperture. In some examples, the mask may form "digital shutter blades" over the camera sensor to adjust the effective aperture.

In another example, effective aperture generator 134 may determine a desired depth of focus or depth of field through the use of artificial intelligence and/or 3D depth sensor 126 (of FIG. 6) and/or depth map 128 (of FIG. 6) to track primary subjects in a scene.

Effective aperture generator 134 may determine the effective aperture, D, to achieve the desired depth of focus or depth of field. The determined effective aperture D, may be sent to display driver 132 to make only D size display pixels/region over the camera sensor transparent. In addition or alternatively, effective aperture generator 134 may determine an alpha value(s) for pixels to be used in mask 324 to implement the effective aperture. For example, effective aperture generator 134 may send mask 324 with alpha value(s) and/or size information 322 (such as a radius or diameter of the effective aperture) to display driver 132 (which may be one or more of one or more processors 110 of FIG. 6).

In some examples, effective aperture generator 134 may use the following formulas from Greenleaf, Allen R., Photographic Optics, The MacMillan Company, New York, 1950, pp. 25-27) to determine a desired effective aperture, D.

Hyperfocal distance $$H = \frac{f^2}{Nc} + f$$

Near distance of acceptable sharpness $$D_n = \frac{s(H-f)}{H+s-2f}$$

Far distance of acceptable sharpness $$D_f = \frac{s(H-f)}{H-s}$$

Where H is the hyperfocal distance in mm, f is the lens focal length in mm, s is the focus distance, Dn is the near distance of the acceptable sharpness, Df is the far distance of the acceptable sharpness, N is the f-number, and C is the circle of confusion in mm. A circle of confusion is a spot caused by a cone of light rays not coming into perfect focus. The f-number is calculated by the definition N=2i/2, where I=1, 2, 3, . . . for f/1.4, f/2, f/2.8. To achieve desired depth of field, D, effective aperture generator 134 may calculate the desired effective aperture based on above formula.

Many screen manufacturers are attempting to design a transparent OLED display panel for an under-display camera feature aiming to achieve a bezel-less display screen. Currently, for some smartphones, a display cutout region (a region that may be addressed or not addressed separately from content to be displayed) may be configurable via software. For example, the Android Framework and SurfaceFlinger may be used. Display cutout dimensions can be configured by https://source.android.com/devices/tech/display/display-cutouts. The cut-out mask layer pixels may only have an alpha component, through which cutout transparency can be adjusted from 0x00 (fully transparent and black) to 0xFF (fully opaque and white) for transparent OLED panels.

Effective aperture generator 134 may dynamically enable and disable this mask layer. In this manner, display 306 may display normal screen content in the cutout area when the under-display camera sensor is not in use or during a blanking period when the under-display camera sensor is not actively capturing image data.

It should be noted that the variable aperture techniques of this disclosure may be dependent on the transparency of the screen hardware as well as the opacity achieved by display pixels. For example, OLED panels can achieve higher transparency, but LCD panels may be better in achieving opaque pixels for region outside aperture diameter as they work on the principle of modulating incoming light (backlight).

Display driver 132 may blend the mask (e.g., the pixel values for pixels within the area over the camera sensor) with pixel values that otherwise would be displayed. Display driver 132 may send the blended display content with the mask 324 to display 306 for display. For example, the blended display content may implement an effective aperture over at least a portion of camera sensor 304 by, for example, changing pixel values or not addressing pixels over at least a portion of camera sensor 304 from what the pixel values otherwise would be. Different examples of effective apertures are shown and described in more detail with respect to FIGS. 8A-8C and FIGS. 9A-9C.

Figure 8C:
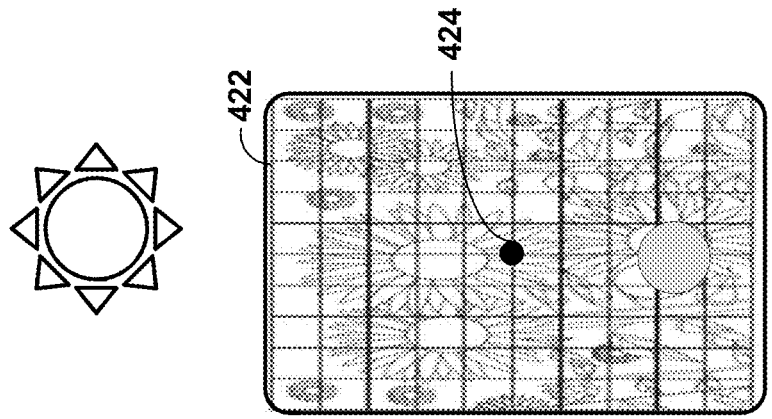
FIGS. 8A-8C are conceptual diagrams illustrating different example effective apertures in a region of a display over an under-display camera sensor in accordance with the techniques of this disclosure.
Figure 8B:
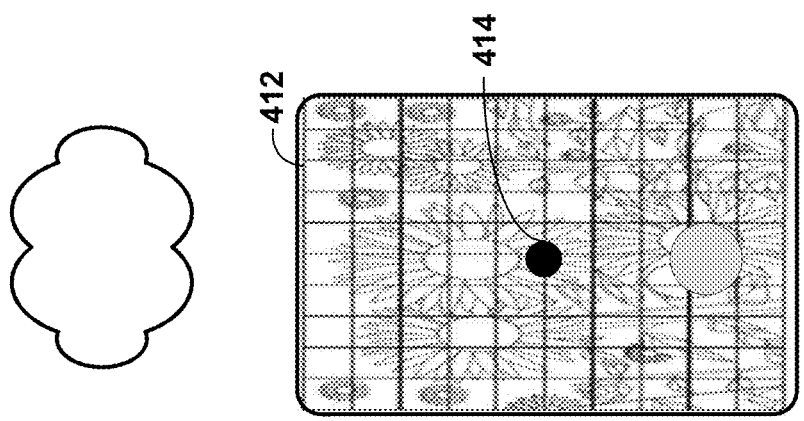
Figure 8A:
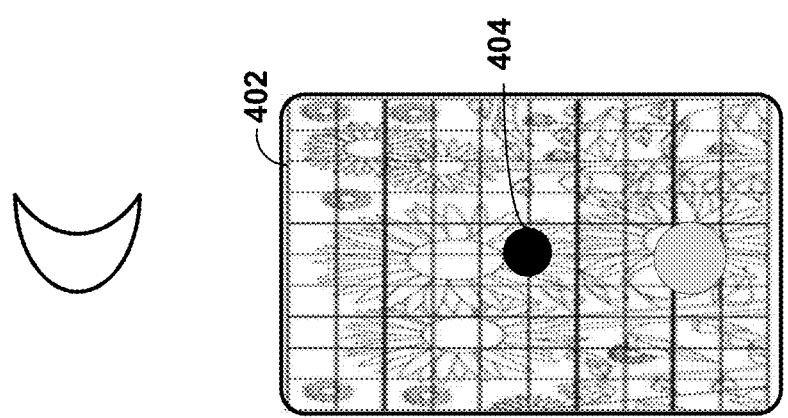

FIGS. 8A-8C are conceptual diagrams illustrating different example effective apertures in a region of a display over an under-display camera sensor in accordance with the techniques of this disclosure. FIG. 8A depicts an example of image capture device 402 (which may be an example of image capture device 102) including a relatively large effective aperture 404. In this example, the effective aperture is implemented by assigning a relatively large number of pixels in the region above the camera sensor (e.g., region 120 above camera sensor 112 of FIG. 6) as black or unaddressed pixels. This increases the amount of light that may reach camera sensor 112, thereby, effectively enlarging the aperture of camera sensor 112. While the effective aperture 404 is shown as circular in shape, effective aperture 404 may be of any shape and the pixels included in effective aperture 404 need not be continuous. For example, a row of pixels over camera sensor 112 may be black, followed by a row that are not, followed by another row that are black. In some examples, effective aperture 404 may be used in low light environments. In some examples, effective aperture 404 may be used in relatively brighter light environments when a user selects an effects mode, such as a bokeh mode.

FIG. 8B depicts an example of image capture device 412 (which may be an example of image capture device 102) including a relatively medium effective aperture 414. In this example, the effective aperture is implemented by assigning a relatively medium number of pixels in the region above the camera sensor (e.g., region 120 above camera sensor 112 of FIG. 6) as black or unaddressed pixels. This decreases the amount of light that may reach camera sensor 112 when compared to effective aperture 404, thereby, effectively reducing the aperture of camera sensor 112. While the effective aperture 414 is shown as circular in shape, effective aperture 414 may be of any shape and the pixels included in effective aperture 414 need not be continuous. In some examples, effective aperture 414 may be used in relatively normal or average light environments. In some examples, effective aperture 414 may be used in relatively brighter light environments when a user selects an effects mode, such as a bokeh mode.

FIG. 8C depicts an example of image capture device 422 (which may be an example of image capture device 102) including a relatively small effective aperture 424. In this example, the effective aperture is implemented by assigning a relatively small number of pixels in the region above the camera sensor (e.g., region 120 above camera sensor 112 of FIG. 6) as black or unaddressed pixels. This decreases the amount of light that may reach camera sensor 112 when compared to effective aperture 404 and effective aperture 414, thereby, effectively further reducing the aperture of camera sensor 112. While the effective aperture 424 is shown as circular in shape, effective aperture 424 may be of any shape and the pixels included in effective aperture 424 need not be continuous. In some examples, effective aperture 424 may be used in relatively bright light environments. In some examples, effective aperture 424 may be used in relatively lower or average light environments when a user selects a certain effects mode.

FIGS. 9A-9C are conceptual diagrams illustrating further examples of effective apertures in a region of a display over an under-display camera sensor in accordance with the techniques of this disclosure. FIG. 9A depicts an example of image capture device 502 (which may be an example of image capture device 102) including a relatively dark (e.g., black) effective aperture 504. In this example, the effective aperture is implemented by assigning a relatively dark alpha value (or values) to a number of pixels in the region above the camera sensor (e.g., region 120 above camera sensor 112 of FIG. 6). This increases the amount of light that may reach camera sensor 112, thereby, effectively enlarging the aperture of camera sensor 112. While the effective aperture 504 is shown as circular in shape, effective aperture 504 may be of any shape and the pixels included in effective aperture 504 need not be continuous. For example, a row of pixels over camera sensor 112 may be relatively dark, followed by a row that are not, followed by another row that are relatively dark. In some examples, effective aperture 504 may be used in low light environments. In some examples, effective aperture 504 may be used in relatively brighter light environments when a user selects an effects mode, such as a bokeh mode.

FIG. 9B depicts an example of image capture device 512 (which may be an example of image capture device 102) including a relatively medium effective aperture 514. In this example, the effective aperture is implemented by assigning a relatively medium alpha value (or values) (e.g., at least one alpha value being higher than at least one alpha value of effective aperture 504) to a number of pixels in the region above the camera sensor (e.g., region 120 above camera sensor 112 of FIG. 6). This decreases the amount of light that may reach camera sensor 112 when compared to effective aperture 504, thereby, effectively reducing the aperture of camera sensor 112. While the effective aperture 514 is shown as circular in shape, effective aperture 514 may be of any shape and the pixels included in effective aperture 514 need not be continuous. In some examples, effective aperture 514 may be used in relatively normal or average light environments. In some examples, effective aperture 514 may be used in relatively brighter light environments when a user selects an effects mode, such as a bokeh mode.

FIG. 9C depicts an example of image capture device 522 (which may be an example of image capture device 102) including a relatively small effective aperture 524. In this example, the effective aperture is implemented by assigning a relatively bright alpha value (or values) (e.g., at least one alpha value being higher than at least one alpha value of effective aperture 504 and at least one alpha value of effective aperture 514) to pixels in the region above the camera sensor (e.g., region 120 above camera sensor 112 of FIG. 6). This decreases the amount of light that may reach camera sensor 112 when compared to effective aperture 504 and effective aperture 514, thereby, effectively further reducing the aperture of camera sensor 112. While the effective aperture 524 is shown as circular in shape, effective aperture 524 may be of any shape and the pixels included in effective aperture 524 need not be continuous. In some examples, effective aperture 524 may be used in relatively bright light environments. In some examples, effective aperture 524 may be used in relatively lower or average light environments when a user selects a certain effects mode.

Figure 10:
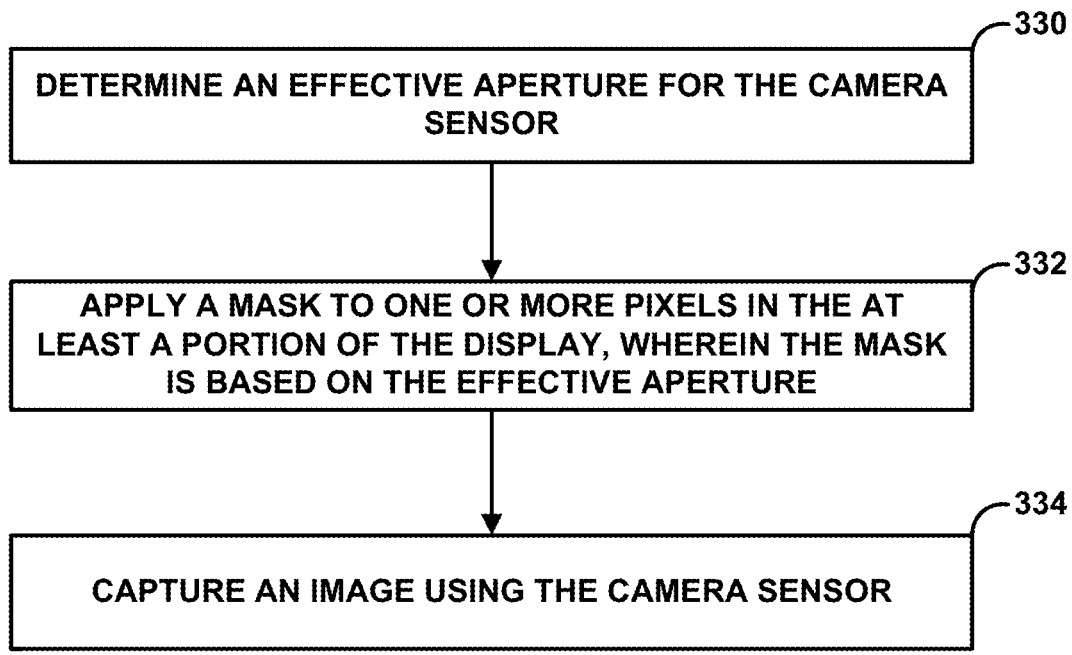
FIG. 10 is a flowchart illustrating example effective aperture techniques according to this disclosure.

FIG. 10 is a flowchart illustrating example effective aperture techniques according to this disclosure. Image capture device 102 (of FIG. 6) may determine an effective aperture for the camera sensor (e.g., camera sensor 112) (132). For example, image capture device 102 may determine an ambient light level, a frame luma, a target luma, whether a flash is on, off, or set to auto, whether a user has selected an effects mode, etc. to generate parameters to be used to determine the effective aperture. Image capture device 102 may use these parameters to determine an effective aperture size and/or alpha level(s) (e.g., the effective aperture). Image capture device 102 may apply a mask to one or more pixels in the at least a portion of the display, wherein the mask is based on the effective aperture (332). For example, image capture device 102 may generate a software defined layer based on the effective aperture which may be used to change pixel values of pixels in region 120 over camera sensor 112 from values that may otherwise be used when displaying an image. Image capture device 102 may apply the mask at a display driver, such as display driver 132 of FIG. 7, and blend the mask with pixel values being supplied to the display driver, such as pixel values representing an image being captured. Image capture device 102 may capture an image using the camera sensor (334). For example, camera sensor 112 may capture data from light passing through at least a portion of a display.

In some examples, as part of applying the mask, one or more processors 110 are configured to apply an alpha value of zero to the one or more pixels in the at least the portion of the display (e.g., region 120 of FIG. 6) or not address the one or more pixels in the at least the portion of the display (e.g., region 120). In some examples, the effective aperture is a first effective aperture, the mask is a first mask, the image is a first image, and the one or more pixels are a first one or more pixels, and wherein one or more processors 110 are further configured to determine a second effective aperture for the camera sensor, determine a second mask based on the second effective aperture, apply the second mask to a second one or more pixels in the at least a portion of the display, and capture a second image using the camera sensor, wherein the second one or more pixels comprises at least one pixel different than the first one or more pixels.

In some examples, one or more processors 110 are further configured to read out the first image from the camera sensor, wherein as part of applying the second mask, one or more processors 110 are configured to apply at least a portion of the second mask during the read out of the first image. In some examples, the at least the portion of the display (e.g., region 120) is a first portion of the display and wherein the mask comprises one or more alpha values different than an alpha value of one or more pixels in a second portion of the display (e.g., a portion of the display different than region 120).

In some examples, determining the effective aperture is based on a focal length of the camera sensor and an f-number. For example, one or more processors 110 may divide a focal length by an f-number. In some examples, the one or more processors 110 determine the effective aperture based on a luma value. In some examples, one or more processors 110 determine the effective aperture based on an output of an auto exposure control module.

In some examples, one or more processors 110 are further configured to determine a depth of field, wherein one or more processors 110 are configured to determine the effective aperture based on the depth of field. In some examples, one or more processors 110 determine the depth of field based on depth data. For example, one or more processors 110 may be configured to use 3D depth sensor 126, depth map 128, or the like, when tracking a primary subject to acquire depth data and may use the depth data when determining the depth of field. In some examples, one or more processors 110 determine the depth of field based on a user input to adjust a depth-of-field effect. In some examples, the user input to adjust the depth-of-field effect may include a user input to touch sensor 124 to select a bokeh mode, soft focus mode, portrait mode, normal mode, or the like.

In some examples, the camera sensor is a first camera sensor, the at least a portion of the display is a first at least a portion of the display, the effective aperture is a first effective aperture, the mask is a first mask, and the image is a first image. In some examples, one or more processors 110 are further coupled to a second camera sensor (e.g., camera sensor 238 of FIG. 2D), the second camera sensor being disposed to receive light through at least a second portion of a display (e.g., region 232C of FIG. 2d). In some examples, one or more processors 110 are further configured to determine a second effective aperture for the second camera sensor. In some examples, one or more processors 110 are further configured to apply a second mask to one or more pixels in the at least a second portion of the display, wherein the second mask is based on the second effective aperture. In some examples, one or more processors 110 capture a second image using the second camera sensor. In some examples, the first effective aperture is the same as the second effective aperture. In other examples, the first effective aperture is different than the second effective aperture. In some examples, one or more processors 110 are further configured to fuse the first image and the second image to create a composite image.

By determining an effective aperture, determining a mask based on the effective aperture and applying the mask to one or more pixels in at least a portion of a display above a camera sensor, the techniques of this disclosure may facilitate the effective changing of a focal length of a fixed aperture camera sensor and may compensate for display shade caused by sub-pixel circuitry being disposed above the camera sensor. These techniques may improve the image quality of an image captured by an under-display camera sensor and may facilitate the use of modes, such as a bokeh mode, soft focus mode, portrait mode, normal mode, or the like.

This disclosure includes the following clauses.

Clause 1. An image capture device comprising: memory; and one or more processors coupled to the memory and a camera sensor, the camera sensor being disposed to receive light through at least a portion of a display, the one or more processors being configured to: determine an effective aperture for the camera sensor; apply a mask to one or more pixels in the at least a portion of the display, wherein the mask is based on the effective aperture; and capture an image using the camera sensor.

Clause 2. The image capture device of clause 1, wherein as part of applying the mask, the one or more processors are configured to apply an alpha value of zero to the one or more pixels in the at least the portion of the display or not address the one or more pixels in the at least the portion of the display.

Clause 3. The image capture device of clause 2, wherein the effective aperture is a first effective aperture, the mask is a first mask, the image is a first image, and the one or more pixels are a first one or more pixels, and wherein the one or more processors are further configured to: determine a second effective aperture for the camera sensor; determine a second mask based on the second effective aperture; apply the second mask to a second one or more pixels in the at least a portion of the display; and capture a second image using the camera sensor, wherein the second one or more pixels comprises at least one pixel different than the first one or more pixels.

Clause 4. The image capture device of clause 3, wherein the one or more processors are further configured to: read out the first image from the camera sensor, wherein as part of applying the second mask, the one or more processors are configured to apply at least a portion of the second mask during the read out of the first image.

Clause 5. The image capture device of any of clauses 1-4, wherein the at least the portion of the display is a first portion of the display and wherein the mask comprises one or more alpha values different than an alpha value of one or more pixels in a second portion of the display.

Clause 6. The image capture device of any of clauses 1-5, wherein determining the effective aperture is based on a focal length of the camera sensor and an f-number.

Clause 7. The image capture device of any of clauses 1-6, wherein the one or more processors determine the effective aperture based on a luma value.

Clause 8. The image capture device of any of clauses 1-7, wherein the one or more processors determine the effective aperture based on an output of an auto exposure control module.

Clause 9. The image capture device of any of clauses 1-8, wherein the one or more processors are further configured to: determine a depth of field, wherein the one or more processors are configured to determine the effective aperture based on the depth of field.

Clause 10. The image capture device of clause 9, wherein the one or more processors determine the depth of field based on depth data.

Clause 11. The image capture device of any of clauses 9-10, wherein the one or more processors determine the depth of field based on a user input to adjust a depth-of-field effect.

Clause 12. The image capture device of any of clauses 1-11, wherein the image capture device is a mobile phone comprising: the display; and the camera sensor.

Clause 13. The image capture device of any of clauses 1-12, wherein the camera sensor is a first camera sensor, the at least a portion of the display is a first at least a portion of the display, the effective aperture is a first effective aperture, the mask is a first mask, and the image is a first image, and the one or more processors are further coupled to a second camera sensor, the second camera sensor being disposed to receive light through at least a second portion of a display, and wherein the one or more processors are further configured to: determine a second effective aperture for the second camera sensor; apply a second mask to one or more pixels in the at least a second portion of the display, wherein the second mask is based on the second effective aperture; and capture a second image using the second camera sensor.

Clause 14. The image capture device of clause 13, wherein the first effective aperture is different than the second effective aperture and wherein the one or more processors are further configured to: fuse the first image and the second image to create a composite image.

Clause 15. A method comprising: determining an effective aperture for a camera sensor, the camera sensor being disposed to receive light through at least a portion of a display; applying a mask to one or more pixels in the at least the portion of the display, wherein the mask is based on the effective aperture; and capturing an image using the camera sensor.

Clause 16. The method of clause 15, wherein applying the mask comprises applying an alpha value of zero to the one or more pixels in the at least the portion of the display or not addressing the one or more pixels in the at least the portion of the display.

Clause 17. The method of clause 16, wherein the effective aperture is a first effective aperture, the mask is a first mask, the image is a first image, and the one or more pixels a first one or more pixels, and the method further comprises: determining a second effective aperture for the camera sensor; determining a second mask based on the second effective aperture; applying the second mask to a second one or more pixels in the at least the portion of the display; and capturing a second image using the camera sensor, wherein the second one or more pixels comprises at least one pixel different than the first one or more pixels.

Clause 18. The method of clause 17, further comprising: reading out the first image from the camera sensor, wherein applying the second mask comprises applying at least a portion of the second mask during the reading out of the first image.

Clause 19. The method of any of clauses 15-18, wherein the at least a portion of the display is a first portion of the display and wherein the mask comprises one or more alpha values different than an alpha value of one or more pixels in a second portion of the display.

Clause 20. The method of any of clauses 15-19, wherein determining the effective aperture is based on a focal length of the camera sensor and an f-number.

Clause 21. The method of any of clauses 15-20, wherein determining the effective aperture is based on a luma value.

Clause 22. The method of any of clauses 15-21, wherein determining the effective aperture is based on an output of an auto exposure control module.

Clause 23. The method of any of clauses 15-22, further comprising: determining a depth of field, wherein, the determining the effective aperture is based on the depth of field.

Clause 24. The method of any of clause 23, wherein the determining the depth of field is based on depth data.

Clause 25. The method of any of clauses 23-24, wherein the determining the depth of field is based on a user input to adjust a depth-of-field effect.

Clause 26. The method of any of clauses 15-25, wherein camera sensor is a first camera sensor, the at least a portion of the display is a first at least a portion of the display, the effective aperture is a first effective aperture, the mask is a first mask, and the image is a first image, and wherein the method further comprises: determining a second effective aperture for a second camera sensor, the second camera sensor being disposed to receive light through at least a second portion of the display; applying a second mask to one or more pixels in the at least the second portion of the display, wherein the second mask is based on the second effective aperture; and capturing a second image using the second camera sensor.

Clause 27. The method of clause 26, further comprising: fusing the first image and the second image to create a composite image, wherein the first effective aperture is different than the second effective aperture.

Clause 28. A non-transitory computer-readable storage medium storing instructions, which when executed, cause one or more processors to: determine an effective aperture for a camera sensor, the camera sensor being disposed to receive light through at least a portion of a display; apply a mask to one or more pixels in the at least a portion of the display, wherein the mask is based on the effective aperture; and capture an image using the camera sensor.

Clause 29. An image capture device comprising: means for determining an effective aperture for a camera sensor, the camera sensor being disposed to receive light through at least a portion of a display; means for applying a mask to one or more pixels in the at least the portion of the display, wherein the mask is based on the effective aperture; and means for capturing an image using the camera sensor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be provided by a collection of interoperative hardware units, including one or more processors as described above, in conjunction with suitable software and/or firmware.

Various examples have been described. These and other examples are within the scope of the following claims.

What is claimed is:

1. An image capture device comprising:
memory; and
one or more processors coupled to the memory and a camera sensor, the camera sensor being disposed to receive light through at least a portion of a display, the one or more processors being configured to:
    determine, based on depth data, a depth of field;
    determine an effective aperture for the camera sensor based on the depth of field;
    output a display frame to the display, the display frame comprising display content and a mask, wherein the mask is based on the effective aperture and is associated with one or more pixels in the portion of the display; and
    capture an image at least partially through the display frame using the camera sensor.

2. The image capture device of claim 1, wherein as part of applying the mask, the one or more processors are configured to apply an alpha value of zero to the one or more pixels in the portion of the display or not address the one or more pixels in the portion of the display.

3. The image capture device of claim 2, wherein the effective aperture is a first effective aperture, the mask is a first mask, the image is a first image, and the one or more pixels are a first one or more pixels, and wherein the one or more processors are further configured to:
    determine a second effective aperture for the camera sensor;
    determine a second mask based on the second effective aperture;
    apply the second mask to a second one or more pixels in the portion of the display; and
    capture a second image at least partially through the second mask using the camera sensor, wherein the second one or more pixels comprises at least one pixel different than the first one or more pixels.

4. The image capture device of claim 3, wherein the one or more processors are further configured to:
    read out the first image from the camera sensor,
    wherein as part of applying the second mask, the one or more processors are configured to apply at least a portion of the second mask during the read out of the first image.

5. The image capture device of claim 1, wherein the portion of the display is a first portion of the display and wherein the mask comprises one or more alpha values different than an alpha value of one or more pixels in a second portion of the display.

6. The image capture device of claim 1, wherein determining the effective aperture is further based on a focal length of the camera sensor and an f-number.

7. The image capture device of claim 1, wherein the one or more processors determine the effective aperture further based on a luma value.

8. The image capture device of claim 1, wherein the one or more processors determine the effective aperture further based on an output of an auto exposure control module.

9. The image capture device of claim 1, wherein the one or more processors determine the depth of field based on a user input to adjust a depth-of-field effect.

10. The image capture device of claim 1, wherein the image capture device is a mobile phone comprising:
the display; and
the camera sensor.

11. The image capture device of claim 1, wherein the camera sensor is a first camera sensor, the at least a portion of the display is a first at least a portion of the display, the effective aperture is a first effective aperture, the mask is a first mask, and the image is a first image, and the one or more processors are further coupled to a second camera sensor, the second camera sensor being disposed to receive light through at least a second portion of a display, and wherein the one or more processors are further configured to:
determine a second effective aperture for the second camera sensor;
apply a second mask to one or more pixels in the at least a second portion of the display, wherein the second mask is based on the second effective aperture; and
capture a second image at least partially through the second mask using the second camera sensor.

12. The image capture device of claim 11, wherein the first effective aperture is different than the second effective aperture and wherein the one or more processors are further configured to:
fuse the first image and the second image to create a composite image.

13. A method comprising:
determining, based on depth data, a depth of field for a camera sensor, the camera sensor being disposed to receive light through at least a portion of a display;
determining an effective aperture based on the depth of field;
outputting a display frame to the display, the display frame comprising display content and a mask, wherein the mask is based on the effective aperture and is associated with one or more pixels in the portion of the display; and
capturing an image at least partially through the display frame using the camera sensor.

14. The method of claim 13, wherein applying the mask comprises applying an alpha value of zero to the one or more pixels in the portion of the display or not addressing the one or more pixels in the portion of the display.

15. The method of claim 14, wherein the effective aperture is a first effective aperture, the mask is a first mask, the image is a first image, and the one or more pixels a first one or more pixels, and the method further comprises:
determining a second effective aperture for the camera sensor;
determining a second mask based on the second effective aperture;
applying the second mask to a second one or more pixels in the portion of the display; and
capturing a second image at least partially through the second mask using the camera sensor, wherein the second one or more pixels comprises at least one pixel different than the first one or more pixels.

16. The method of claim 15, further comprising:
reading out the first image from the camera sensor, wherein applying the second mask comprises applying at least a portion of the second mask during the reading out of the first image.

17. The method of claim 13, wherein the portion of the display is a first portion of the display and wherein the mask comprises one or more alpha values different than an alpha value of one or more pixels in a second portion of the display.

18. The method of claim 13, wherein determining the effective aperture is further based on a focal length of the camera sensor and an f-number.

19. The method of claim 13, wherein determining the effective aperture is further based on a luma value.

20. The method of claim 13, wherein determining the effective aperture is further based on an output of an auto exposure control module.

21. The method of claim 13, wherein the determining the depth of field is based on a user input to adjust a depth-of-field effect.

22. The method of claim 13, wherein camera sensor is a first camera sensor, the at least a portion of the display is a first at least a portion of the display, the effective aperture is a first effective aperture, the mask is a first mask, and the image is a first image, and wherein the method further comprises:
determining a second effective aperture for a second camera sensor, the second camera sensor being disposed to receive light through at least a second portion of the display;
applying a second mask to one or more pixels in the at least the second portion of the display, wherein the second mask is based on the second effective aperture; and
capturing a second image at least partially through the second mask using the second camera sensor.

23. The method of claim 22, further comprising:
fusing the first image and the second image to create a composite image, wherein the first effective aperture is different than the second effective aperture.

24. A non-transitory computer-readable storage medium storing instructions, which when executed, cause one or more processors to:
determine, based on depth data, a depth of field for a camera sensor, the camera sensor being disposed to receive light through at least a portion of a display;
determine an effective aperture based on the depth of field;
output a display frame to the display, the display frame comprising display content and a mask, wherein the mask is based on the effective aperture and is associated with one or more pixels in the portion of the display; and
capture an image at least partially through the display frame using the camera sensor.

25. The image capture device of claim 1, wherein the depth data is indicative of a location of a primary subject and is based on at least one of output of a depth sensor or a depth map.

26. The method of claim 13, wherein the depth data is indicative of a location of a primary subject and is based on at least one of output of a depth sensor or a depth map.

27. The image capture device of claim 25, wherein the depth sensor is a 3-dimensional depth sensor.

28. The method of claim 26, wherein the depth sensor is a 3-dimensional depth sensor.

* * * * *